(12) United States Patent
Squiers (10) Patent No.: US 12,466,455 B2
(45) Date of Patent: Nov. 11, 2025

(54) TRANSPORTATION DEVICE FOR UNITS IN MODULAR SYSTEM

(71) Applicant: Milwaukee Electric Tool Corporation, Brookfield, WI (US)

(72) Inventor: Grant T. Squiers, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 301 days.

(21) Appl. No.: 18/358,368

(22) Filed: Jul. 25, 2023

(65) Prior Publication Data

US 2024/0034378 A1 Feb. 1, 2024

Related U.S. Application Data (63) Continuation of application No. PCT/US2023/028326, filed on Jul. 21, 2023.

(60) Provisional application No. 63/392,349, filed on Jul. 26, 2022.

(51) Int. Cl.
*B62B 3/04* (2006.01)
*B62B 3/02* (2006.01)
*B62B 5/06* (2006.01)

(52) U.S. Cl.
CPC .............. *B62B 3/04* (2013.01); *B62B 3/02* (2013.01); *B62B 5/067* (2013.01); *B62B 2203/44* (2013.01); *B62B 2206/04* (2013.01)

(58) Field of Classification Search
CPC .. B62B 3/02; B62B 3/04; B62B 5/067; B62B 2203/44; B62B 2206/02; B62B 2206/04
See application file for complete search history.

(56) References Cited

U.S. PATENT DOCUMENTS

| | | |
|---|---|---|
| 3,424,334 A | 1/1969 | Goltz |
| 4,595,107 A | 6/1986 | Welsch |
| 4,705,247 A | 11/1987 | Delmerico |
| 4,763,799 A | 8/1988 | Cohn et al. |
| 4,790,610 A | 12/1988 | Welch et al. |
| 4,998,023 A | 3/1991 | Kitts |
| 5,011,240 A | 4/1991 | Kelley et al. |
| 5,016,948 A | 5/1991 | Welch et al. |
| 5,308,012 A | 5/1994 | Fuller |
| 5,566,961 A | 10/1996 | Snell et al. |
| 5,634,649 A | 6/1997 | Breining et al. |

(Continued)

FOREIGN PATENT DOCUMENTS

| | | |
|---|---|---|
| CN | 216886751 | 7/2022 |
| DE | 202014103695 | 12/2014 |

(Continued)

OTHER PUBLICATIONS

US 8,273,008 B2, 09/2012, Quirico et al. (withdrawn)

(Continued)

*Primary Examiner* — Erez Gurari
(74) *Attorney, Agent, or Firm* — Reinhart Boerner Van Deuren s.c.

(57) ABSTRACT

A transportation device configured to detachably engage with units, such as modular units, is provided. The transportation device is configured to actuate between a closed position and an open position. One or more of the transportation device are is configured to couple to and help move one or more units, such as modular units in one or more of the open position and the closed position.

20 Claims, 7 Drawing Sheets

(56) References Cited

U.S. PATENT DOCUMENTS

| | | |
|---|---|---|
| 5,765,842 A | 6/1998 | Phaneuf et al. |
| 5,890,613 A | 4/1999 | Williams |
| 5,915,723 A | 6/1999 | Austin |
| 5,971,512 A | 10/1999 | Swan |
| 6,065,189 A | 5/2000 | Trine |
| 6,270,094 B1 | 8/2001 | Campbell |
| 6,497,423 B1 | 12/2002 | Perelli et al. |
| 6,572,123 B2 | 6/2003 | Calmeise et al. |
| 6,739,605 B2 | 5/2004 | Calmeise et al. |
| 6,758,482 B2 | 7/2004 | Stallbaumer |
| 6,843,488 B1 | 1/2005 | Tseng |
| 6,983,946 B2 | 1/2006 | Sullivan et al. |
| D515,767 S | 2/2006 | Arceta et al. |
| D517,768 S | 3/2006 | Arceta et al. |
| D518,267 S | 3/2006 | Arceta et al. |
| 7,014,200 B2 | 3/2006 | Calmeise et al. |
| 7,111,852 B2 | 9/2006 | Woods et al. |
| 7,213,817 B2 | 5/2007 | Cheung |
| 7,306,245 B1 | 12/2007 | Lowe |
| 7,338,054 B2 | 3/2008 | Pint |
| 7,398,978 B2 | 7/2008 | Cheung |
| 7,594,668 B2 | 9/2009 | Arceta et al. |
| 7,806,426 B2 | 10/2010 | Van Landingham, Jr. et al. |
| 7,815,215 B1 | 10/2010 | Lowe |
| 7,862,534 B2 | 1/2011 | Quirico et al. |
| 7,954,830 B2 | 6/2011 | Begin et al. |
| 8,070,181 B2 | 12/2011 | Forrest et al. |
| 8,109,526 B2 | 2/2012 | Mason et al. |
| 8,215,650 B2 | 7/2012 | Arceta et al. |
| 8,282,111 B2 | 10/2012 | Hailston et al. |
| 8,322,732 B2 | 12/2012 | McKay et al. |
| 8,333,160 B2 | 12/2012 | Lin |
| 8,424,883 B1 | 4/2013 | Ramos |
| 8,505,960 B1 | 8/2013 | Shindelar et al. |
| 8,695,996 B2 | 4/2014 | Janick et al. |
| 8,708,352 B2 | 4/2014 | Quirico et al. |
| 8,720,913 B2 | 5/2014 | Fallon et al. |
| 8,740,010 B1 | 6/2014 | Page |
| 8,814,199 B2 | 8/2014 | Shindelar et al. |
| 8,864,149 B2 | 10/2014 | Stryker et al. |
| 8,894,076 B2 | 11/2014 | Hailston et al. |
| 8,944,444 B1 | 2/2015 | Tvrdy |
| 8,967,632 B1 | 3/2015 | Gunsaullus |
| 9,114,203 B2 | 8/2015 | Quirico et al. |
| 9,123,449 B2 | 9/2015 | Quirico et al. |
| 9,216,753 B2 | 12/2015 | Bryan et al. |
| 9,242,664 B2 | 1/2016 | Arceta et al. |
| 9,254,856 B2 | 2/2016 | Oachs |
| 9,266,547 B2 | 2/2016 | Schumaker et al. |
| 9,272,722 B2 | 3/2016 | Dufoure et al. |
| 9,283,975 B2 | 3/2016 | McClanahan et al. |
| 9,299,467 B2 | 3/2016 | Hidem et al. |
| 9,299,468 B2 | 3/2016 | Hidem et al. |
| 9,375,835 B1 | 6/2016 | Lin |
| 9,446,509 B2 | 9/2016 | Martin |
| 9,452,768 B2 | 9/2016 | Fodrocy et al. |
| 9,457,828 B1 | 10/2016 | Guirlinger |
| 9,493,177 B1 | 11/2016 | Chen et al. |
| 9,527,205 B1 | 12/2016 | Lin |
| 9,597,053 B2 | 3/2017 | Hidem et al. |
| 9,607,722 B2 | 3/2017 | Hidem et al. |
| 9,616,562 B2 | 4/2017 | Hoppe et al. |
| 9,623,887 B1 | 4/2017 | Brassard et al. |
| 9,655,307 B2 | 5/2017 | Burmann |
| 9,675,984 B1 | 6/2017 | Sotelo |
| 9,717,844 B2 | 8/2017 | Quirico et al. |
| 9,750,869 B2 | 9/2017 | Hidem et al. |
| 9,750,870 B2 | 9/2017 | Hidem et al. |
| 9,751,549 B2 | 9/2017 | McClanahan et al. |
| 9,814,826 B2 | 11/2017 | Hidem et al. |
| 9,849,899 B1 | 12/2017 | Guirlinger |
| 9,862,398 B1 | 1/2018 | Guirlinger |
| 9,937,941 B2 | 4/2018 | Chen et al. |
| 10,086,508 B2 | 10/2018 | Hoppe et al. |
| 10,093,335 B2 | 10/2018 | Thuma et al. |
| 10,118,632 B2 | 11/2018 | Carzola |
| 10,239,546 B1 | 3/2019 | Scott |
| D844,324 S | 4/2019 | Hoppe et al. |
| 10,246,116 B2 | 4/2019 | Oltman et al. |
| 10,335,537 B2 | 7/2019 | Hidem et al. |
| 10,356,986 B2 | 7/2019 | Burmann |
| 10,376,630 B2 | 8/2019 | Hidem et al. |
| 10,391,625 B2 | 8/2019 | Gang et al. |
| D862,026 S | 10/2019 | Carzola |
| 10,427,702 B2 | 10/2019 | Phillips et al. |
| 10,486,722 B2 | 11/2019 | Alves De Moraes et al. |
| 10,501,104 B2 | 12/2019 | Simmons et al. |
| 10,583,962 B2 | 3/2020 | Brunner et al. |
| 10,703,534 B2 | 7/2020 | Brunner et al. |
| 10,750,833 B2 | 8/2020 | Burchia |
| 10,773,374 B2 | 9/2020 | Hoppe et al. |
| RE48,237 E | 10/2020 | Fodrocy et al. |
| D911,654 S | 2/2021 | Yu et al. |
| D911,657 S | 2/2021 | Yu et al. |
| 10,913,474 B1 | 2/2021 | Chiao et al. |
| 11,192,690 B1 | 12/2021 | Brunner et al. |
| 2002/0030337 A1 | 3/2002 | Calmeise et al. |
| 2002/0130598 A1 | 9/2002 | Schmidt |
| 2003/0139080 A1 | 7/2003 | Lafragette et al. |
| 2004/0227315 A1 | 11/2004 | Van Landingham et al. |
| 2004/0262867 A1 | 12/2004 | Arceta et al. |
| 2005/0011037 A1 | 1/2005 | Zhao et al. |
| 2005/0023786 A1 | 2/2005 | Delmerico |
| 2005/0248109 A1 | 11/2005 | Chang |
| 2006/0232032 A1 | 10/2006 | Goldberg |
| 2007/0138041 A1 | 6/2007 | Welsh |
| 2008/0000171 A1 | 1/2008 | McKay et al. |
| 2008/0084036 A1 | 4/2008 | Keeler |
| 2008/0302585 A1 | 12/2008 | Perelli et al. |
| 2009/0189498 A1 | 7/2009 | Catron et al. |
| 2009/0230644 A1 | 9/2009 | Stanley |
| 2009/0319079 A1 | 12/2009 | Arceta et al. |
| 2010/0066045 A1 | 3/2010 | Presnell et al. |
| 2010/0283227 A1 | 11/2010 | Perelli et al. |
| 2011/0260588 A1 | 10/2011 | Lin |
| 2012/0274196 A1 | 11/2012 | Arceta et al. |
| 2012/0310031 A1 | 12/2012 | Quirico et al. |
| 2013/0033014 A1 | 2/2013 | Yang |
| 2013/0127129 A1 | 5/2013 | Bensman et al. |
| 2013/0307238 A1 | 11/2013 | Campbell et al. |
| 2014/0084187 A1 | 3/2014 | Quirico et al. |
| 2014/0265440 A1 | 9/2014 | Chen et al. |
| 2014/0343418 A1 | 11/2014 | Quirico et al. |
| 2015/0097348 A1 | 4/2015 | Steinfels et al. |
| 2015/0225006 A1 | 8/2015 | Thiel |
| 2016/0009306 A1 | 1/2016 | Garcia |
| 2016/0287900 A1 | 10/2016 | Quirico et al. |
| 2016/0325042 A1 | 11/2016 | Hidem et al. |
| 2017/0166352 A1 | 6/2017 | Hoppe et al. |
| 2018/0093035 A1 | 4/2018 | Hidem et al. |
| 2018/0161975 A1* | 6/2018 | Brunner ............... B62B 1/14 |
| 2018/0301233 A1 | 10/2018 | Quirico et al. |
| 2019/0023298 A1 | 1/2019 | Carzola |
| 2019/0039637 A1 | 2/2019 | Thuma et al. |
| 2019/0084602 A1 | 3/2019 | Ribbe et al. |
| 2019/0225371 A1 | 7/2019 | Hoppe et al. |
| 2019/0307949 A1 | 10/2019 | Hidem et al. |
| 2020/0039553 A1 | 2/2020 | Abohammdan et al. |
| 2020/0147781 A1 | 5/2020 | Squiers et al. |
| 2020/0165036 A1 | 5/2020 | Squiers et al. |
| 2020/0223585 A1 | 7/2020 | Brunner et al. |
| 2020/0262459 A1* | 8/2020 | Brunner ............... B62B 5/049 |
| 2020/0299027 A1 | 9/2020 | Brunner et al. |
| 2020/0346677 A1 | 11/2020 | Yu et al. |
| 2020/0401133 A1 | 12/2020 | Armbrust et al. |
| 2020/0406446 A1 | 12/2020 | Hoppe et al. |
| 2021/0016928 A1 | 1/2021 | Brunner et al. |
| 2021/0031975 A1 | 2/2021 | Brunner et al. |
| 2021/0300447 A1* | 9/2021 | Brunner ............... B62B 1/002 |
| 2023/0122425 A1* | 4/2023 | Camp ............... B25H 3/021 |

(56) References Cited

U.S. PATENT DOCUMENTS

FOREIGN PATENT DOCUMENTS

| EP | 1724069 A2 | 11/2006 |
| EP | 2537641 B1 | 9/2016 |
| EP | 2338650 B1 | 10/2016 |
| EP | 3944929 | 2/2022 |
| GB | 2211486 | 7/1989 |
| JP | 2015-081066 | 4/2015 |
| WO | WO0144035 | 6/2001 |
| WO | WO05016071 | 2/2005 |
| WO | WO2014/125484 | 8/2014 |
| WO | WO19228647 | 12/2019 |

OTHER PUBLICATIONS

International Search Report and Written Opinion for International Application No. PCT/US2023/028326, dated Nov. 9, 2023, 12 pages.
Inter Partes Review No. 2024-01400, "Petition for Inter Partes Review of U.S. Pat. No. 11,365,026" Filed Sep. 17, 2024, 147 pages.
Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of U.S. Pat. No. 11,794,952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794,952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

\* cited by examiner

TRANSPORTATION DEVICE FOR UNITS IN MODULAR SYSTEM

CROSS-REFERENCE TO RELATED PATENT APPLICATIONS

The present application is a continuation of International Application No. PCT/US2023/028326, filed Jul. 21, 2023, which claims the benefit of and priority to U.S. Application No. 63/392,349 filed on Jul. 26, 2022, each of which is incorporated herein by reference in its entirety.

BACKGROUND OF THE INVENTION

The present disclosure is directed generally to transportation. The present disclosure relates specifically to a mobile device configured to couple to one or more units within a modular system.

SUMMARY OF THE INVENTION

One embodiment of the invention relates to a mobile support device configured to move and support utility modules on a worksite. The mobile support device includes a base including a first top surface and a cavity, the first top surface facing upward and away from the cavity, a handle coupled to and extending upward from the base, an extension slidably coupled to the base, a plurality of wheels, each of which are coupled to one of the base or the extension, and a first plurality of female couplers defined by the second top surface. The handle is configured to be grasped while the base is being pulled or pushed across a ground surface. The extension slides into and out of the cavity between a retracted position and an extended position. The extension includes a second top surface, and the second top surface is at least partially directly beneath the first top surface when the extension is in the retracted position. Each of the first plurality of female couplers includes a recessed surface, a first rib, and a second rib. The first rib and the second rib each extend over the recessed surface. Each of the first plurality of female couplers are configured for arresting engagement with male couplers of a first utility module.

Another embodiment of the invention relates to a mobile support device configured to move and support utility modules on a worksite. The mobile support device includes a base including an upper wall and a cavity, the upper wall defining a first top surface facing upward and away from the cavity, a handle coupled to and extending upward from the base, an extension coupled to the base, a plurality of wheels, each of which are coupled to one of the base or the extension, a first plurality of female couplers defined by the first top surface, and a second plurality of female couplers defined by the second top surface. The handle is configured to be grasped while the base is being pulled or pushed across a ground surface. The extension includes a second top surface and actuates between a first position and a second position with respect to the base. Each of the first plurality of female couplers includes a recessed surface, a first rib, and a second rib. The first rib and the second rib each extend over the recessed surface. Each of the first plurality of female couplers are configured for arresting engagement with male couplers of a first utility module. Each of the second plurality of female couplers includes a recessed surface, a first rib, and a second rib. The first rib and the second rib each extend over the recessed surface. Each of the second plurality of female couplers are configured for arresting engagement with male couplers of the first utility module. When the extension is in the first position with respect to the base, access to the second plurality of female couplers for arresting engagement with male couplers of the first utility module is blocked by the upper wall. When the extension is in the second position with respect to the base, the second plurality of female couplers are facing upward and access to the second plurality of female couplers for arresting engagement with the male couplers of the first utility module is not blocked by the upper wall.

Another embodiment of the invention relates to a mobile support device configured to move and support utility modules on a worksite. The mobile support device includes a base defining a first top surface, a handle coupled to and extending upward from the base, a first plurality of wheels coupled to the base, an extension pivotally coupled to the base, and a first plurality of female couplers defined by the second top surface. The handle is configured to be grasped while the base is being pulled or pushed across a ground surface. The extension defines a second top surface. The extension pivotally actuates between an open position and a closed position with respect to the base. The second top surface and the first top surface are facing towards each other when the extension is in the closed position, and the second top surface and the first top surface are both facing upward when the extension is in the open position. Each of the first plurality of female couplers includes a recessed surface, a first rib, and a second rib. The first rib and the second rib each extend over the recessed surface. Each of the first plurality of female couplers are configured for arresting engagement with male couplers of a first utility module.

Another embodiment of the invention relates to a mobile support device configured to move and support utility modules on a worksite. The mobile support device includes a base defining a first top surface and a cavity, a first plurality of wheels coupled to the base, an extension slidably coupled to the base such that the extension slides into and out of the cavity, the extension defining a second top surface, a second plurality of wheels coupled to the extension, a first plurality of female couplers defined by the first top surface, and a second plurality of female couplers defined by the second top surface. Each of the first plurality of female couplers and each of the second plurality of female couplers includes a recessed surface, a first rib, and a second rib, the first rib and the second rib each extending over the recessed surface. Each of the first plurality of female couplers are configured for arresting engagement with male couplers of a first utility module.

In various embodiments, the base and the extension collectively define a length that varies as the extension slides into and out of the cavity. In various embodiments, each of the first plurality of female couplers and each of the second plurality of female couplers includes a back wall, a first sidewall, a second sidewall, and a front wall extending upward from the recessed surface. The first rib extends from the backwall towards the front wall and the first rib extends from the first sidewall towards the second sidewall. The second rib extends from the backwall towards the front wall and the second rib extends from the second sidewall towards the first sidewall. In various embodiments, the mobile support device includes a handle extending from the base, the handle configured to be grasped while the mobile support device is being pulled or pushed across a ground surface.

Another embodiment of the invention relates to a mobile support device configured to move and support utility modules on a worksite. The mobile support device includes a base defining a first top surface and a cavity, a first plurality of wheels coupled to the base, an extension pivotally coupled to the base, the extension defining a second top surface, a second plurality of wheels coupled to the extension, a first plurality of female couplers defined by the first top surface, and a second plurality of female couplers defined by the second top surface. The extension pivotally actuates between an open position and a closed position. In the closed position the first top surface and the second top surface are facing each other. In the open position the first top surface and the second top surface are both facing vertical (e.g., first top surface and the second top surface are coplanar and facing upward). Each of the first plurality of female couplers and the second plurality of female couplers includes a recessed surface, a first rib, and a second rib, the first rib and the second rib each extending over the recessed surface, each of the first plurality of female couplers are configured for arresting engagement with male couplers of a first utility module.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a transportation device configured for use within a modular system are shown. The transportation device is configured to detachably engage with units, such as modular units, to facilitate moving the modular units. The transportation device is also configured to actuate between a closed position and an open position. In various embodiments, the transportation device slidably actuates between the retracted position and the extended position.

In the expanded position, the transportation device can couple to two different stacks of utility modules, with one stack coupled to the base and one stack coupled to the extension. In the retracted position, the transportation device maintains a smaller profile compared to the expanded position (e.g., is shorter), but still couples to a single stack of utility modules. Applicant has observed that providing a transportation device that actuates between being shorter and coupling to a single stack of utility modules and being longer and coupling to multiple stacks of utility modules provides users the flexibility to customize the transportation device to their current needs.

The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, etc., of any shape and size, and wherein any utility module can be detachably attached to any other utility module. The term 'utility assembly' as used herein denotes any set of utility modules configured for articulation to one another, either as a stationary unit or locomotive.

Referring to FIGS. 1-5, a transportation device, shown as mobile support device 110, is shown according to an exemplary embodiment. Mobile support device 110 is configured to move and support utility modules (e.g., utility module 400 in FIG. 9) on a worksite. Mobile support device 110 includes a base 120 and extension 140 slidably coupled to base 120 such that extension 140 slides into and out of the cavity 130 between a retracted position and an extended position. Mobile support device 110 includes handle 112 coupled to and extending from base 120. In various embodiments, handle 112 extends and retracts with respect to base 120. Handle 112 is configured to be grasped while the base 120 is being pulled or pushed across a ground surface. In various embodiments, mobile support device 110 includes a plurality of wheels (e.g., wheels 126 and/or wheels 146), each of which is coupled to one of base 120 or extension 140.

In various embodiments, the plurality of wheels (e.g., rear wheels 126 and/or wheels 146) coupled to one of base 120 and extension 140 includes a plurality of rear wheels 126 coupled to a rear 136 of the base 120, the cavity 130 facing away from the rear 136 of the base 120. In various embodiments, the plurality of wheels (e.g., rear wheels 126 and/or wheels 146) coupled to one of base 120 and extension 140 includes a plurality of rear wheels 126, the rear wheels 126 extending below bottom surface 138 of base 120 opposite the top surface 122, and handle 112 extends above top surface 122.

Base 120 includes upper wall 121, which defines top surface 122, a front 124, one or more wheels 126, one or more coupling mechanisms, shown as female couplers 132, arranged across top surface 122, and a cavity 130, the top surface 122 facing upward and away from the cavity 130. In various embodiments, a plurality of female couplers 132 are defined by top surface 122. Base 120 and extension 140 collectively define a length 114 that varies as the extension 140 actuates between the retracted position and the extended position, and the length 114 is measured along an axis 116 parallel to a direction 190 (FIG. 3) that the first and second ribs 186, 188 extend from a back wall 176 of the female couplers (e.g., female couplers 150). Extension 140 extends out of and retracts into cavity 130, thereby decreasing or increasing a length 114 (e.g., horizontal length) of mobile support device 110. In various embodiments, extension 140 extends out of a front 124 of base 120.

Female couplers 132 are configured to detachably couple base 120 to one or more utility modules within a modular system. For example, a utility module is coupled to base 120 by sliding the utility module in direction 128 with respect to base 120. Base 120 includes latch recess 134 configured to receive a latch projecting from the first utility module (e.g., latch 404 of utility module 400 in FIG. 9) when the first plurality of female couplers 132 are in arresting engagement with the male couplers of the first utility module, thereby rigidly coupling the first utility module to the base 120.

Extension 140 includes a top surface 142, a front 144, one or more wheels 146, and one or more coupling mechanisms, shown as female couplers 150 arranged across top surface 142 such as via female couplers 150 being defined by top surface 142. In various embodiments, a plurality of female couplers 150 are defined by top surface 142. Extension 140 is slidably coupled to base 120 such that extension 140 slides in direction 152 when retracting into cavity 130. In various embodiments, top surface 142 is at least partially directly beneath the top surface 122 when extension 140 is in the retracted position. In various embodiments, the plurality of female couplers 150 are covered within the cavity 130 when the extension 140 is in the retracted position (e.g., FIG. 2), and the plurality of female couplers 150 are exposed when the extension 140 is in the extended position (e.g., FIG. 1).

Female couplers 150 are configured to detachably couple extension 140 to one or more utility modules within a modular system. For example, a utility module is coupled to extension 140 by sliding the utility module in direction 148 with respect to extension 140. Extension includes latch recess 154 that is configured to receive a latch (e.g., latch 404) projecting from the utility module (e.g., utility module 400) when the first plurality of female 150 couplers are in arresting engagement with the male couplers (e.g., male couplers 402) of the first utility module, thereby rigidly coupling the first utility module to the extension 140.

In various embodiments, when the extension 140 is in a first position (e.g., the retracted position) with respect to base 120, access to the plurality of female couplers 150 for arresting engagement with male couplers of the first utility module (e.g., male couplers 402 of utility module 400) is blocked by upper wall 121, and when the extension 140 is in a second position (e.g., the extended position) with respect to base 120, the plurality of female couplers 150 are facing upward and access to the plurality of female couplers 150 for arresting engagement with male couplers of the first utility module (e.g., male couplers 402 of utility module 400) is not blocked by the upper wall 121.

Figure 3:
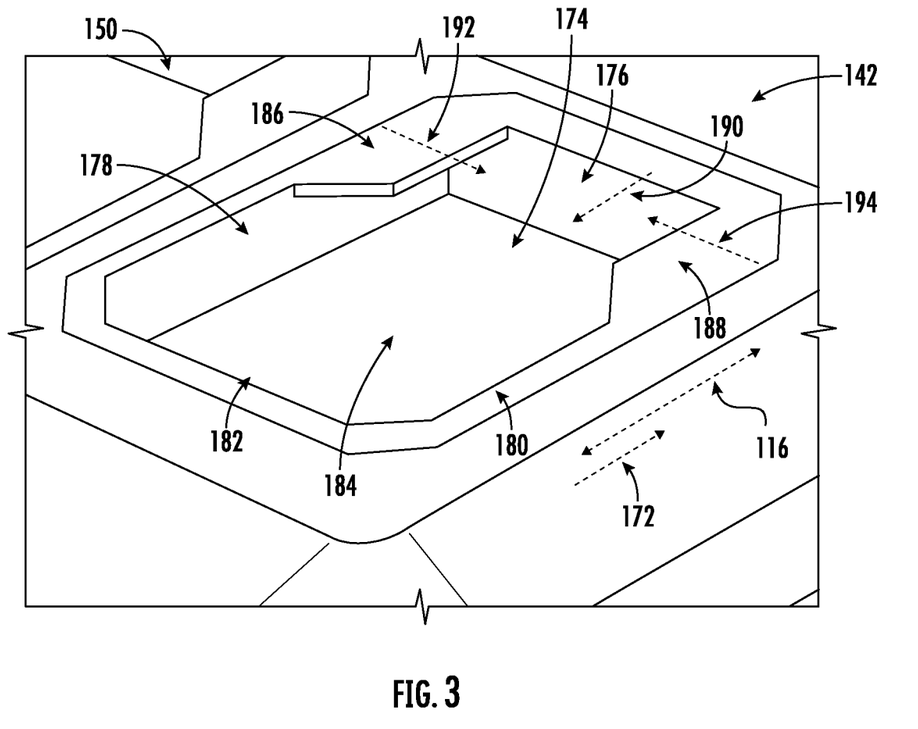
FIG. 3 is a detailed perspective view of a portion of the mobile support device of FIG. 1, according to an exemplary embodiment.
Figure 4:
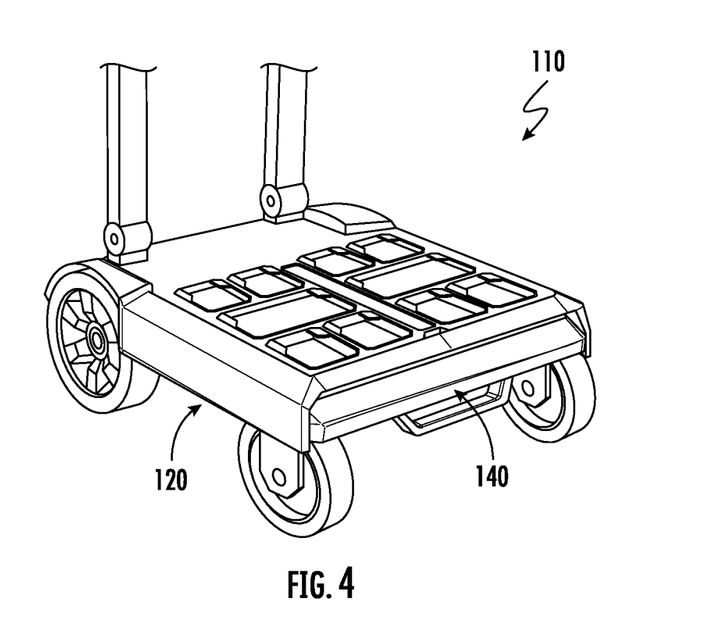
FIG. 4 is a perspective schematic view of the mobile support device of FIG. 1, according to an exemplary embodiment.
Figure 5:
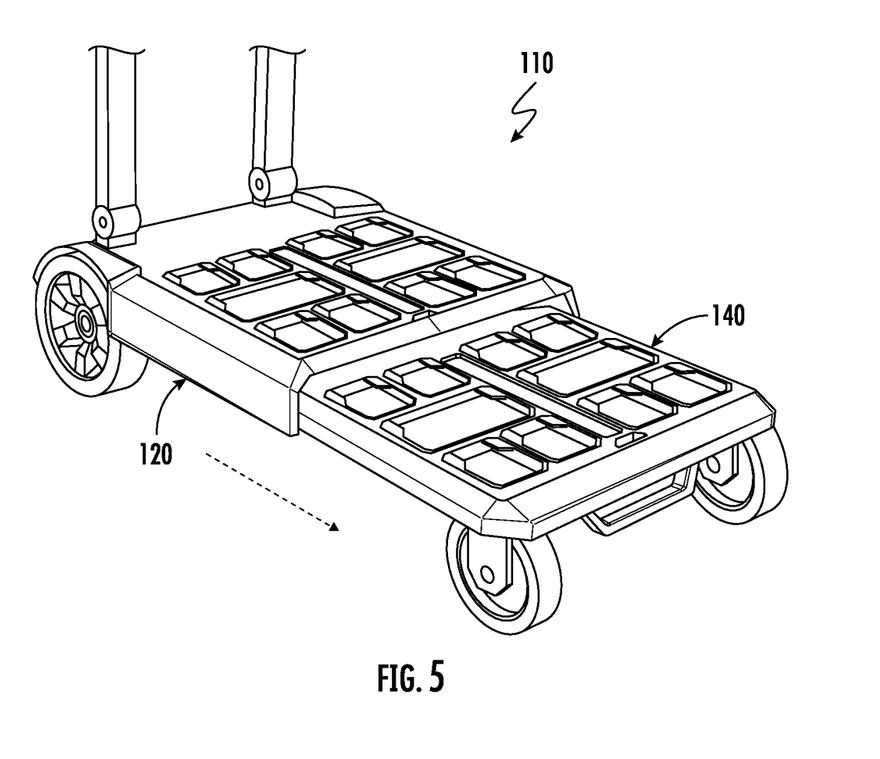
FIG. 5 is a perspective schematic view of the mobile support device of FIG. 1, according to an exemplary embodiment.

Referring to FIG. 3, various aspects of female coupler 150 are shown. In various embodiments female couplers 132 are structurally and functionally the same or similar to female coupler 150.

Female coupler 150 includes a recessed surface 174 below top surface 142, first rib 186, and second rib 188, the first rib 186 and the second rib 188 each extending over the recessed surface 174. Each of the plurality of female couplers 150 are configured for arresting engagement with male couplers of a first utility module (e.g., male couplers 402 of utility module 400 in FIG. 9). Female coupler(s) 150 include back wall 176, opposing front wall 182, first sidewall 178, and opposing second sidewall 180 extend upward from recessed surface 174. Female coupler 150 includes a pocket 184 collectively defined by recessed surface 174, back wall 176, front wall 182, first sidewall 178, and second sidewall 180.

First rib 186 extends from back wall 176 and first sidewall 178 above pocket 184 and/or recessed surface 174. In particular, first rib 186 extends in direction 192 from first sidewall 178 towards second sidewall 180 and first rib 186 extends in direction 190 from back wall 176. Second rib 188 extends from back wall 176 and second sidewall 180 above pocket 184 and/or recessed surface 174. In particular, second rib 188 extends in direction 194 from second sidewall 180 towards first sidewall 178 and second rib 188 extends in direction 190 from back wall 176. In various embodiments, each of first rib 186 and second rib 188 extend from the back wall 176 in a forward direction 190 towards a front 124 of the base 120, and extension 140 slides in the forward direction 190 with respect to the base 120 when the extension 140 is actuating from the retracted position to the extended position (e.g., from the position in FIG. 2 to the position shown in FIG. 1).

In a specific embodiment, female couplers 132, latch recess 134, female couplers 150, and/or latch recess 154 are compatible with the coupling mechanism(s) described in International Patent International Patent Publication No. WO 2017/191628, which is hereby incorporated by reference in its entirety.

Figure 1:
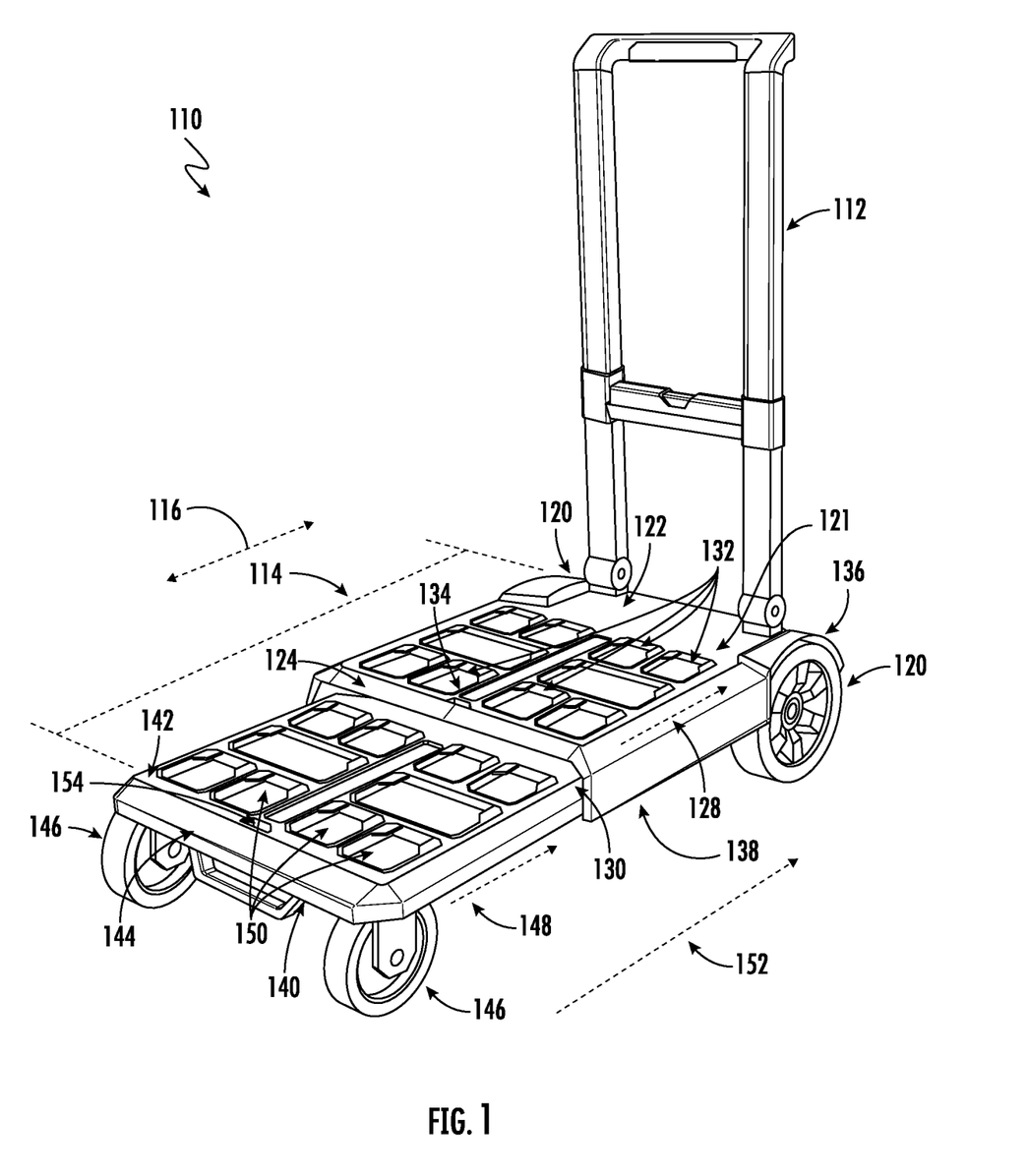
FIG. 1 is a perspective view of a mobile support device, according to an exemplary embodiment.
Figure 2:
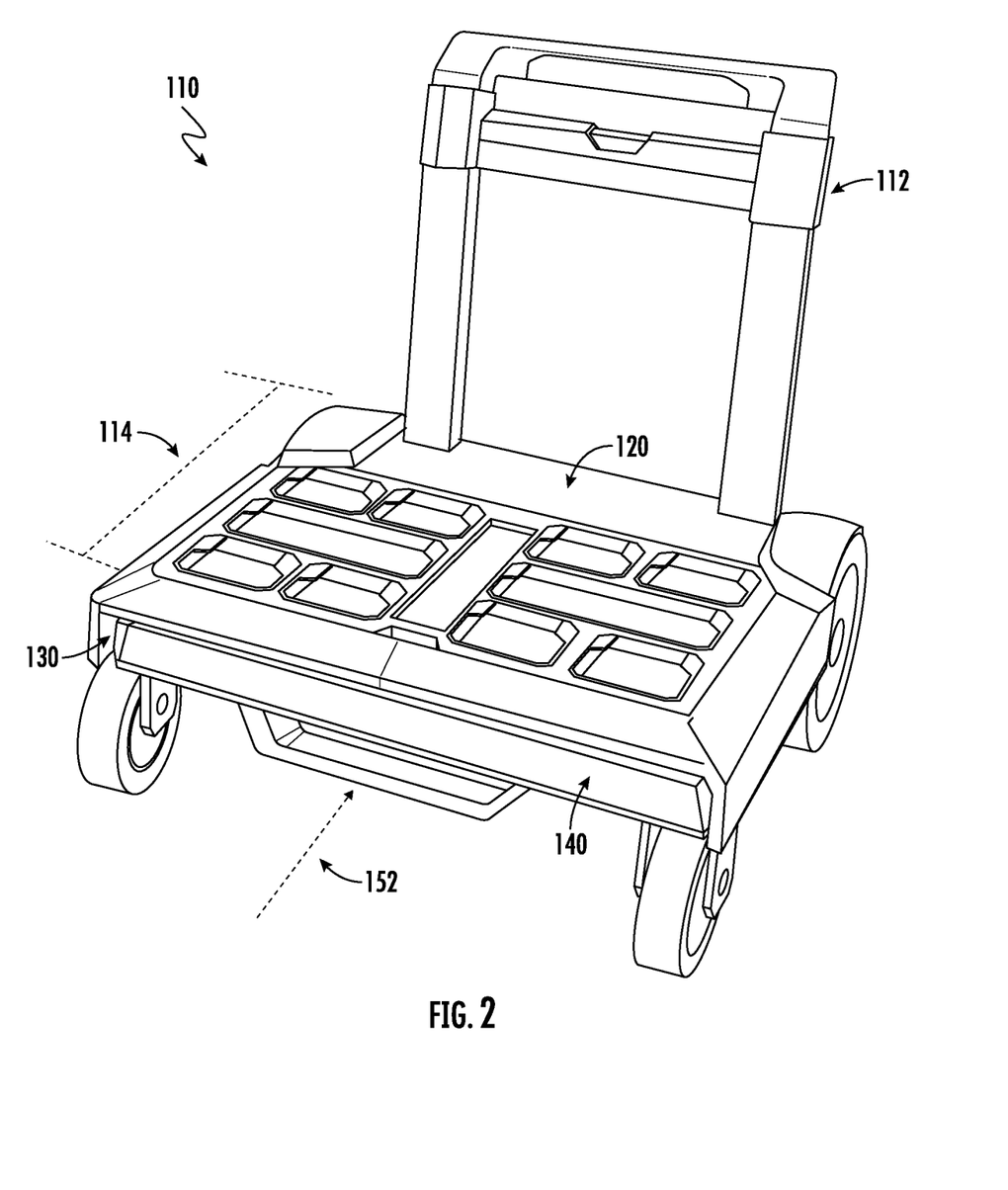
FIG. 2 is a perspective view of the mobile support device of FIG. 1, according to an exemplary embodiment.

In an alternative embodiment, female couplers 132 are arranged in a perpendicular arrangement to that shown in FIG. 1. As a result, the coupling direction to couple a utility module to base 120 is from a side of base 120 rather than from front 124 of base 120. A benefit of this configuration is that a stack of utility modules coupled to a top of base 120 can be accessed (e.g., the fronts of the utility modules can be accessed to open a lid) even if there is a second stack of utility modules coupled to a top of extension 140.

Figure 6:
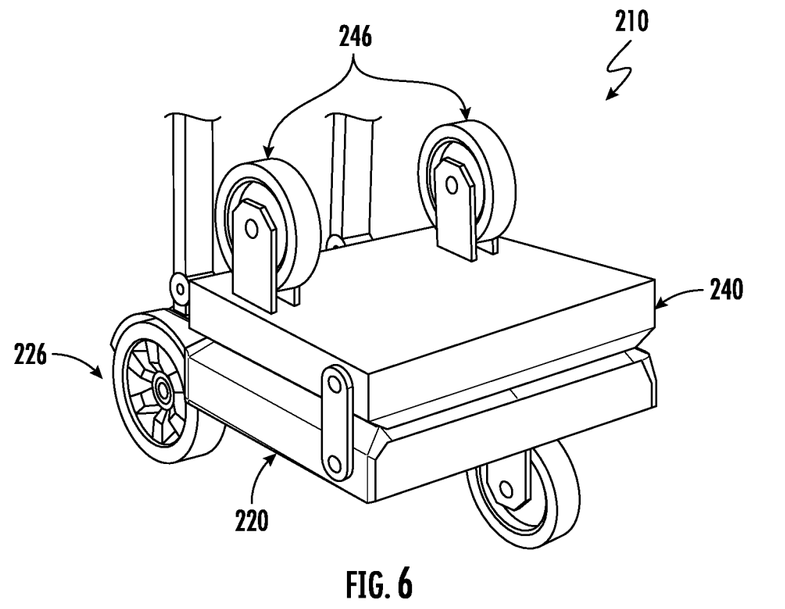
FIG. 6 is a perspective view of a mobile support device, according to another exemplary embodiment.
Figure 7:
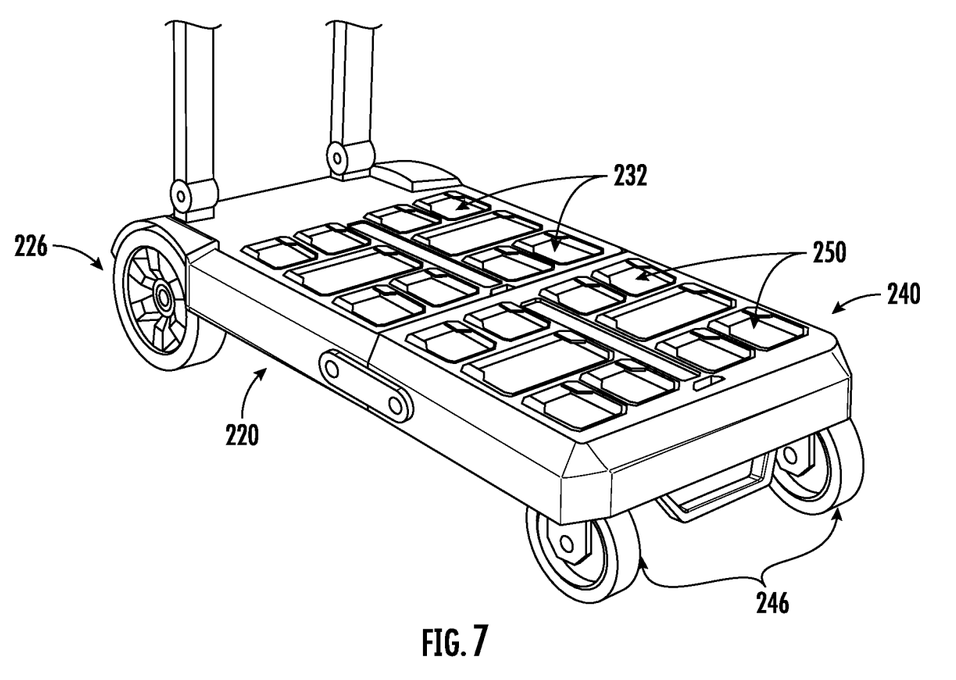
FIG. 7 is a perspective view of the mobile support device of FIG. 6, according to an exemplary embodiment.

Referring to FIGS. 6-7, mobile support device 210 is shown according to an exemplary embodiment. Mobile support device 210 is substantially the same as mobile support device 110 except for the differences discussed herein. In particular, extension 240 is pivotally coupled to base 220.

When in the closed configuration (FIG. 6), female couplers 232 of base 220 and female couplers 250 of extension 240 are arranged facing each other and cannot be accessed, and wheels 246 are facing up and not interfacing with the ground. In this configuration, mobile support device 210 can be stored in a more compact space, and mobile support device 210 can be moved via wheels 226. When in the open configuration, (FIG. 7), female couplers 232 of base 220 and female couplers 250 of extension 240 are accessible for coupling to one or more utility modules (e.g., utility modules with male couplers on the bottom surface). When open, wheels 226 and wheels 226 interface with the ground to facilitate moving mobile support device 210 across a surface such as the ground.

In various embodiments, when the extension 240 is in a first position (e.g., the retracted position) with respect to base 220, access to the plurality of female couplers 250 for arresting engagement with male couplers of the first utility module (e.g., male couplers 402 of utility module 400) is blocked by the upper wall of base (shown in FIG. 6), and when the extension 240 is in a second position (e.g., the extended position) with respect to base 220, the plurality of female couplers 250 are facing upward and access to the plurality of female couplers 250 for arresting engagement with male couplers of the first utility module (e.g., male couplers 402 of utility module 400) is not blocked by the upper wall of the base.

Figure 8:
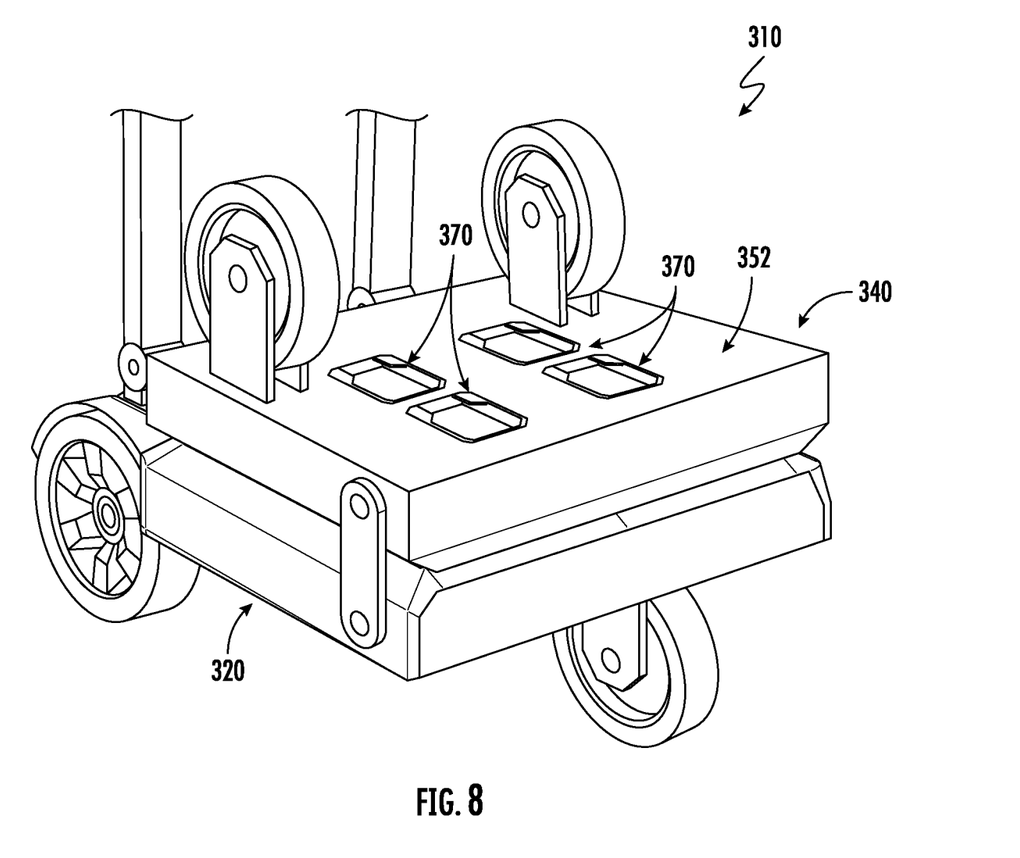
FIG. 8 is a perspective view of a mobile support device, according to another exemplary embodiment.

Referring to FIG. 8, mobile support device 310 is shown according to an exemplary embodiment. Mobile support device 310 is substantially the same as mobile support device 210 except for the differences discussed herein.

In particular, first surface 352 of extension 340 includes one or more coupling mechanisms, shown as female couplers 370. In use, female couplers 370 are configured to couple to a utility module when mobile support device 310 is in the closed configuration. Thus, a utility module can be coupled to mobile support device 310 even when mobile support device is in the closed configuration (e.g., when extension 340 is covering a top surface of base 320).

In various embodiments, when the extension 340 is in a first position (e.g., the retracted position) with respect to base 320, access to the plurality of female couplers extending from a top of extension 340 for arresting engagement with male couplers of the first utility module (e.g., male couplers 402 of utility module 400) is blocked by the upper wall of base (shown in FIG. 8), and when the extension 340 is in a second position (e.g., the extended position) with respect to base 320, the plurality of female couplers are facing upward and access to the plurality of female couplers for arresting engagement with male couplers of the first utility module (e.g., male couplers 402 of utility module 400) is not blocked by the upper wall of the base.

Figure 9:
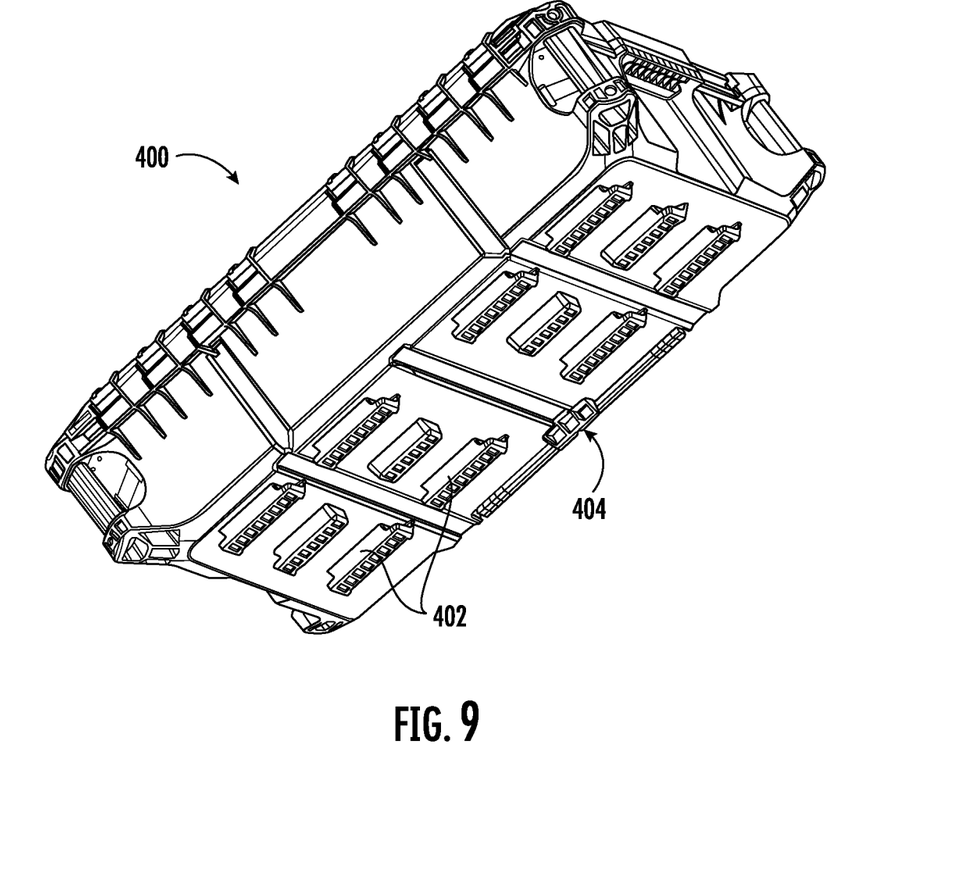
FIG. 9 is a perspective view of a utility module, according to an exemplary embodiment.

Referring to FIG. 9, various aspects of utility module 400 are shown. Utility module 400 includes male couplers 402 and latch 404.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature. As used herein, "rigidly coupled" refers to two components being coupled in a manner such that the components move together in a fixed positional relationship when acted upon by a force.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A mobile support device configured to move and support utility modules on a worksite, the mobile support device comprising:
   a base comprising a first top surface and a cavity, the first top surface facing upward and away from the cavity;
   a handle coupled to and extending upward from the base, the handle configured to be grasped while the base is being pulled or pushed across a ground surface;
   an extension slidably coupled to the base such that the extension slides into and out of the cavity between a retracted position and an extended position, the extension comprising a second top surface, wherein the second top surface is at least partially directly beneath the first top surface when the extension is in the retracted position;

a plurality of wheels, each of which are coupled to one of the base or the extension; and a first plurality of female couplers defined by the second top surface, each of the first plurality of female couplers comprising a recessed surface, a first rib, and a second rib, the first rib and the second rib each extending over the recessed surface, each of the first plurality of female couplers are configured for arresting engagement with male couplers of a first utility module.

2. The mobile support device of claim 1, wherein the first plurality of female couplers are covered within the cavity when the extension is in the retracted position, and the first plurality of female couplers are exposed when the extension is in the extended position.

3. The mobile support device of claim 1, comprising a second plurality of female couplers defined by the first top surface, each of the second plurality of female couplers comprising a recessed surface, a first rib, and a second rib, the first rib and the second rib each extending over the recessed surface, each of the second plurality of female couplers are configured for arresting engagement with the male couplers of the first utility module.

4. The mobile support device of claim 1, the base and the extension collectively defining a length that varies as the extension actuates between the retracted position and the extended position.

5. The mobile support device of claim 4, wherein the length is measured along an axis parallel to a direction that the first and second ribs extend from a back wall of the female couplers.

6. The mobile support device of claim 1, the plurality of wheels comprising a plurality of rear wheels coupled to a rear of the base, the cavity facing away from the rear of the base.

7. The mobile support device of claim 1, the plurality of wheels comprising a plurality of rear wheels coupled to a rear of the base, the rear wheels extending below a bottom surface of the base opposite the first top surface, and the handle extending above the first top surface.

8. The mobile support device of claim 1, each of the first plurality of female couplers comprising a back wall, a first sidewall and a second sidewall, the first rib extending from the first sidewall towards the second sidewall, and the second rib extending from the second sidewall towards the first sidewall, wherein each of the first rib and the second rib extend from the back wall in a forward direction towards a front of the base, and wherein the extension slides in the forward direction with respect to the base when the extension is actuating from the retracted position to the extended position.

9. The mobile support device of claim 1, the extension comprising a first latch recess configured to receive a latch projecting from the first utility module when the first plurality of female couplers are in arresting engagement with the male couplers of the first utility module, thereby rigidly coupling the first utility module to the extension.

10. A mobile support device configured to move and support utility modules on a worksite, the mobile support device comprising:

a base comprising an upper wall and a cavity, the upper wall defining a first top surface facing upward and away from the cavity;

a handle coupled to and extending upward from the base, the handle configured to be grasped while the base is being pulled or pushed across a ground surface;

an extension coupled to the base, the extension comprising a second top surface, wherein the extension actuates between a first position and a second position with respect to the base;

a plurality of wheels, each of which are coupled to one of the base or the extension;

a first plurality of female couplers defined by the first top surface, each of the first plurality of female couplers comprising a recessed surface, a first rib, and a second rib, the first rib and the second rib each extending over the recessed surface, each of the first plurality of female couplers are configured for arresting engagement with male couplers of a first utility module; and a second plurality of female couplers defined by the second top surface, each of the second plurality of female couplers comprising a recessed surface, a first rib, and a second rib, the first rib and the second rib each extending over the recessed surface, each of the second plurality of female couplers are configured for arresting engagement with the male couplers of the first utility module, wherein:

when the extension is in the first position with respect to the base, access to the second plurality of female couplers for arresting engagement with male couplers of the first utility module is blocked by the upper wall; and when the extension is in the second position with respect to the base, the second plurality of female couplers are facing upward and access to the second plurality of female couplers for arresting engagement with male couplers of the first utility module is not blocked by the upper wall.

11. The mobile support device of claim 10, the plurality of wheels comprising a plurality of rear wheels coupled to a rear of the base, the rear wheels extending below a bottom surface of the base opposite the first top surface, and the handle extending above the first top surface.

12. The mobile support device of claim 10, the base comprising a latch recess configured to receive a latch projecting from the first utility module when the first plurality of female couplers are in arresting engagement with the male couplers of the first utility module, thereby rigidly coupling the first utility module to the base.

13. The mobile support device of claim 10, the extension comprising a latch recess configured to receive a latch projecting from the first utility module when the second plurality of female couplers are in arresting engagement with the male couplers of the first utility module, thereby rigidly coupling the first utility module to the extension.

14. The mobile support device of claim 10, wherein the extension is pivotally coupled to the base.

15. The mobile support device of claim 10, wherein the extension is slidably coupled to the base such that the base and the extension collectively define a length that varies as the extension actuates between a retracted position and an extended position, and wherein the length is measured along an axis parallel to a direction that the first and second ribs extend from a back wall of the female couplers.

16. A mobile support device configured to move and support utility modules on a worksite, the mobile support device comprising:
a base defining a first top surface;
a handle coupled to and extending upward from the base, the handle configured to be grasped while the base is being pulled or pushed across a ground surface;
a first plurality of wheels coupled to the base;
an extension pivotally coupled to the base, the extension defining a second top surface, wherein the extension pivotally actuates between an open position and a closed position with respect to the base, wherein the second top surface and the first top surface are facing towards each other when the extension is in the closed position, and wherein the second top surface and the first top surface are both facing upward when the extension is in the open position; and
a first plurality of female couplers defined by the second top surface, each of the first plurality of female couplers comprising a recessed surface, a first rib, and a second rib, the first rib and the second rib each extending over the recessed surface, each of the first plurality of female couplers are configured for arresting engagement with male couplers of a first utility module.

17. The mobile support device of claim 16, comprising a second plurality of wheels coupled to the extension.

18. The mobile support device of claim 16, a second plurality of female couplers defined by the first top surface, each of the second plurality of female couplers comprising a recessed surface, a first rib, and a second rib, the first rib and the second rib each extending over the recessed surface, each of the second plurality of female couplers are configured for arresting engagement with male couplers of a first utility module.

19. The mobile support device of claim 16, the extension comprising a first latch recess configured to receive a latch projecting from the first utility module when the first plurality of female couplers are in arresting engagement with the male couplers of the first utility module, thereby rigidly coupling the first utility module to the extension.

20. The mobile support device of claim 16, each of the first plurality of female couplers comprising a back wall, a first sidewall and a second sidewall, the first rib extending from the first sidewall towards the second sidewall, and the second rib extending from the second sidewall towards the first sidewall, wherein each of the first rib and the second rib extend from the back wall in a forward direction away from the handle.

* * * * *